A. M. WALSTROM

Sept. 3, 1929. METAL HOOP Re. 17,423

Original Filed June 1, 1925 2 Sheets-Sheet 1

INVENTOR
Axel M. Walstrom

A. M. WALSTROM

Sept. 3, 1929. METAL HOOP Re. 17,423

Original Filed June 1, 1925 2 Sheets-Sheet 2

INVENTOR
Axel M. Walstrom

Reissued Sept. 3, 1929. Re. 17,423

UNITED STATES PATENT OFFICE.

AXEL M. WALSTROM, OF MINNEAPOLIS, MINNESOTA, ASSIGNOR TO ELGIN BUTTER TUB COMPANY, OF ELGIN, ILLINOIS, A CORPORATION OF ILLINOIS.

METAL HOOP.

Original No. 1,605,628, dated November 2, 1926, Serial No. 33,981, filed June 1, 1925. Application for reissue filed August 22, 1928. Serial No. 301,373.

My invention relates to metal hoops as used on coopered packages such as pails, tubs, kegs and barrels. These coopered packages are made up of tapered wooden staves placed edge to edge in a cylindrical cone-shaped form, on which the hoops are forced with considerable pressure in order to draw said staves together to make a tight package. When these packages are stored in a dry place, they frequently shrink to such extent that the hoops thereon loosen, drop off and allow the staves to fall apart. It also happens when a package has shrunk considerably that the user will drive the hoops beyond their original position on the package, and in such case, when the package is filled with a moist commodity, the staves will swell and exert an undue pressure that strains the hoops beyond the breaking point.

The object of my invention is to provide a metal hoop which will grip the surface of the package, even tho said package has shrunk considerably by drying.

Another object is a hoop having a better appearance and which may be formed by a simple machine, as compared to the beaded hoop now in general use and which is hereinafter referred to.

A further object is a hoop in which the bead, provided on one edge thereof, is open so as to receive the over-lapping end to form an improved joint, as will hereinafter appear.

My invention consists of a flat metal strip corrugated longitudinally and rolled into a hoop with overlapping ends secured together. This hoop is flared to fit the tapered package and the forward edge is turned slightly outwardly to facilitate the driving thereof, and the rear edge of said hoop is provided with a corrugation or bead having an inwardly turned edge which is adapted to be forced into intimate contact with the staves, to prevent accidental displacement of said hoop on the package.

My invention consists, further, of the features shown and described in the following drawings, specifications and claims.

In the drawings:—

Figure 1:
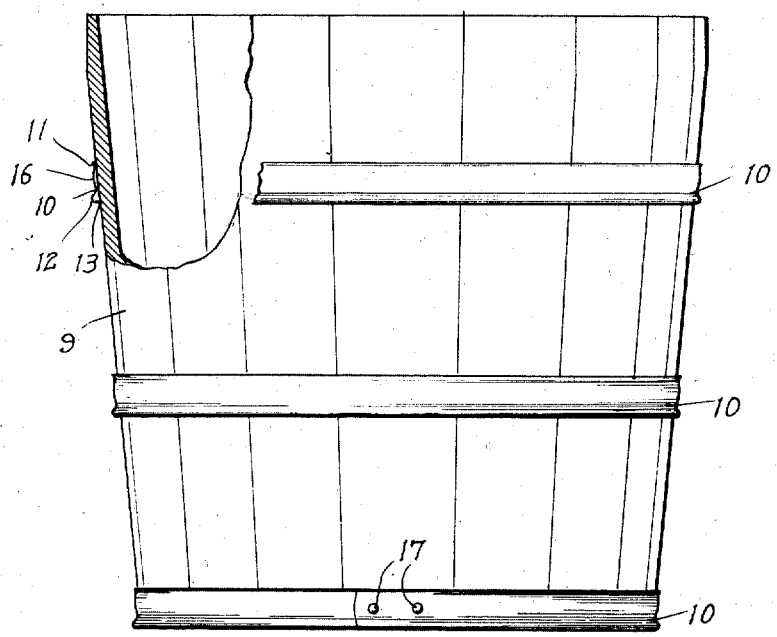
Fig. 1 is a side view, partially in section, of a tub provided with my improved hoops.

In all the views, numeral 9 indicates a wooden package or tub used for shipping and storing butter, lard and similar commodities. This tub is made up of a number of tapered staves placed edge to edge and bound together by hoops 10 of an improved construction, which I claim as my invention.

The metal hoops now generally used on butter tubs are made of flat metal strips with a bead formed on one edge thereof. This bead is circular in cross section and practically closed, and as the sharp edge of the hoop is rolled over onto the hoop itself to form this bead, this sharp edge cannot be utilized for the purpose hereinafter described. Also, in lapping the ends of this beaded hoop, an unsightly and awkward joint results, due to the doubled-up beads at this point, which tend to skew the ends of the hoop out of alinement during the riveting operation. And further, the operation of forming this closed bead and the mechanism required therefor is more difficult and complicated than the operation and mechanism required to form the open bead, or corrugation, employed in my improved hoop.

The hoop 10 is flared to fit the tapered surface of the tub 9, and the forward flared edge 11 is turned slightly outwardly to prevent this sharp edge cutting into the staves during the driving operation.

Figure 2:
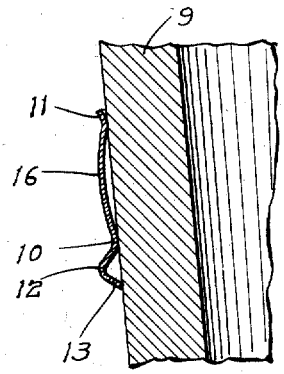
Fig. 2 is a sectional view showing a portion of a tub with my improved hoop in cross section and as it appears before being driven into place on said tub.
Figure 3:
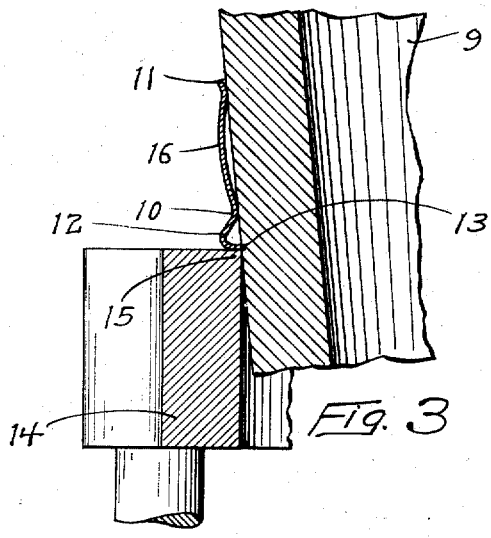
Fig. 3 is a view similar to Fig. 2, showing my improved hoop driven into place on the tub and crimped into position thereon by the hoop driving member.

The other, or rear, edge of the hoop 10 is provided with a circumferential corrugation 12 having its edge 13 turned inwardly into contact with the surface of the tub as shown in Fig. 2, and at an angle thereto as shown. A hoop driving machine (not shown) is employed to force the hoops onto the tub with considerable pressure, and this machine carries expanding hoop driving rings composed of segments 14 having a shoulder 15 to engage the edge 13 of the hoop. Now, when the hoops 10 are driven to a point where the tub is tight, further progress of the hoop is checked, and continued movement of the segments 14 will force the edge 13 into the position shown in Fig. 3, with said edge crimped into the surface of the tub to secure the hoop thereon against accidental displacement. I prefer to provide a wide, shallow corrugation 16 near the center of the hoop to improve the appearance thereof and also to provide a recess to accommodate the heads of the rivets 17 at the joint. This shallow corrugation also has a tendency to make the hoop more elastic so that it would be more likely to stretch under abnormal stress. It will be understood that it is rather difficult to make a flared hoop out of a strip of flat material. In order to do this and to maintain the strip in substantially one plane, it is necessary that the metal be stretched adjacent one edge of the strip to give the frusto-conical shape. By forming the plurality of corrugations in the strips, such as the deep corrugation 13 and the shallower corrugation 16, a flared or frusto-conical shape is given to the hoop. It will be noted that the circumferential lines at the innermost parts of the hoop lie in a conical surface, while the outermost lines at the outer side of the hoop lie substantially in a cylindrical surface or in a line which is parallel to the longitudinal axis of the tub or container.

Figure 4:
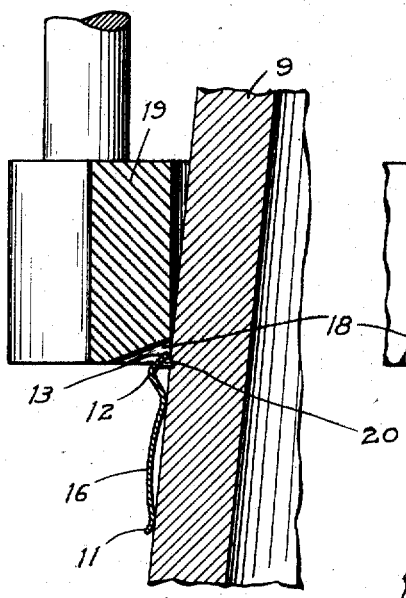
Fig. 4 is a view similar to Fig. 3, showing my improved hoop crimped into place by a modified driving member shown in Fig. 5, by which the crimped edge of my improved hoop is escalloped as shown in Fig. 6.
Figure 5:
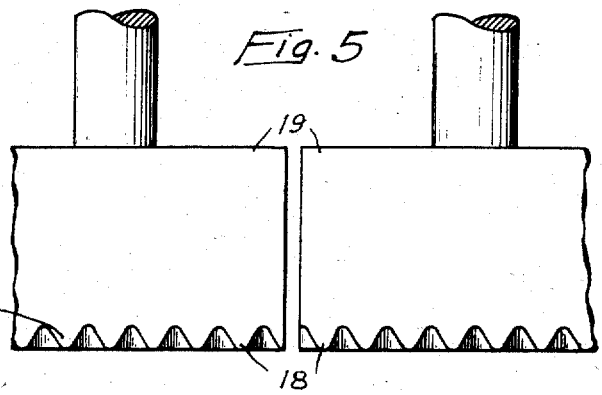
Figure 6:
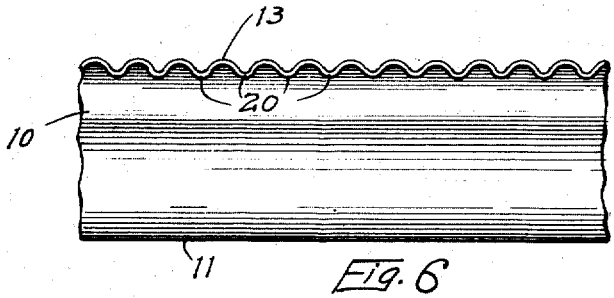

In Figs. 4, 5 and 6, I have shown how the edge 13 of the hoop 10 may be escalloped or formed with transverse corrugations or teeth by the serrated edge 18 of the hoop driving segments 19. This escalloped edge will serve to increase the crimping effect, due to the number of small points or teeth 20 entering the surface of the tub.

Figure 7:
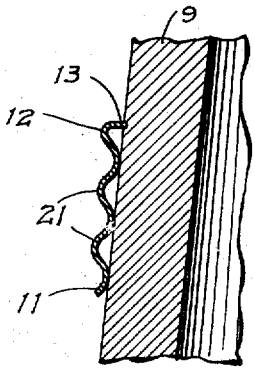
Figs. 7 and 8, show a modified form of corrugations as applied to my invention.
Figure 8:
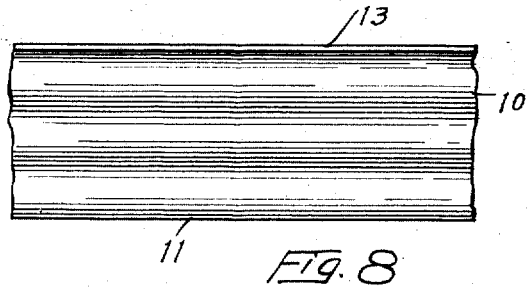

Figs. 7 and 8 illustrate how the hoop may be provided with a number of smaller corrugations or teeth 21, which may be desirable on certain styles of packages.

From the foregoing description, it is evident that my improved hoop has several novel and meritorious features, including: the open bead or corrugation 12 which is easier to make, makes a better lapped joint and which provides a crimping edge 13; and also the corrugation 16 which forms a recess for the rivet heads and which improves the appearance of the hoop and makes it more elastic.

What is claimed is:—

1. A metal hoop for a tapered container, having a frusto-conical form, having its edge at its smaller end turned inwardly to bite into the material of said container and having a wide shallow circumferentially extending corrugation disposed intermediate its edges with its concave side directed inwardly and having its edge at its larger end turned slightly outwardly, said hoop engaging said container only along circumferential lines at the sides of said corrugation and at said inturned edge.

2. A metal hoop for a tapered container having a frusto-conical form and having its edge at its larger end turned outwardly and its other edge turned inwardly into contact with the container, and provided with a comparatively deep circumferentially extending outwardly curved bead at said latter edge and a comparatively wide and shallow corrugation between said first mentioned edge and said bead, whereby inner lines of said hoop lie in a conical surface.

3. A metal hoop for a tapered container having a plurality of circumferentially extending corrugations, one of said corrugations being adjacent one edge of said hoop and having its concave side directed inwardly, the free edge of said corrugation being bent inwardly and toward the opposite edge of said hoop into the material of said container.

4. The structure set forth in claim 3, said free edge of said corrugation being further provided with a plurality of transverse corrugations or teeth adapted to bite into the material of said container.

5. A metal hoop for a tapered container, having a frusto-conical form and having its edge at its smaller end provided with a circumferentally extending comparatively deep corrugation with the concave side thereof directed inwardly, the free edge of said corrugation being bent inwardly to bite into the material of said container, said hoop also having a wider comparatively shallow circumferentially extending corrugation with its concave side directed inwardly adjacent said corrugation, said hoop engaging said container along the line between said corrugations.

6. A closed metal hoop for a tapered container having a frusto-conical form and having its edge at its larger end turned slightly outwardly and its edge at its smaller end turned inwardly to bite into the material of said container, a plurality of circumferentially extending grooves between said edges, said grooves having their concave sides directed inwardly.

7. A hoop for a tapered body having a plurality of circumferentially extending corrugations therein of different sizes, the innermost lines of said corrugations lying in a conical surface and the outermost lines of said corrugations lying in a cylindrical surface having its axis substantially co-incident with the longitudinal axis of said container whereby a hoop of frusto-conical shape is formed.

8. A metal hoop for a frusto-conical container comprising a strip of material having a plurality of corrugations extending longitudinally thereof, said corrugations, respectively, varying in depth from one edge of said hoop toward the other, the innermost lines of said corrugations at the inner side of said hoop being disposed in a conical surface and engaging said container, whereby a frustoconical hoop is formed.

9. A hoop for an upwardly flaring container comprising a ring of sheet metal having its edge at its upper side curved outwardly on a comparatively small radius, said hoop having a bead at its other edge formed on a small radius compared to the width of said ring, said ring curving outwardly between said outwardly curved edge and bead and engaging the container along narrow zones adjacent said outwardly curved edge and bead.

In testimony whereof I affix my signature.

AXEL M. WALSTROM.